Oct. 29, 1935.  J. E. RASMUSEN  2,018,804
ARRANGEMENT FOR COOLING AIR
Filed Sept. 4, 1934
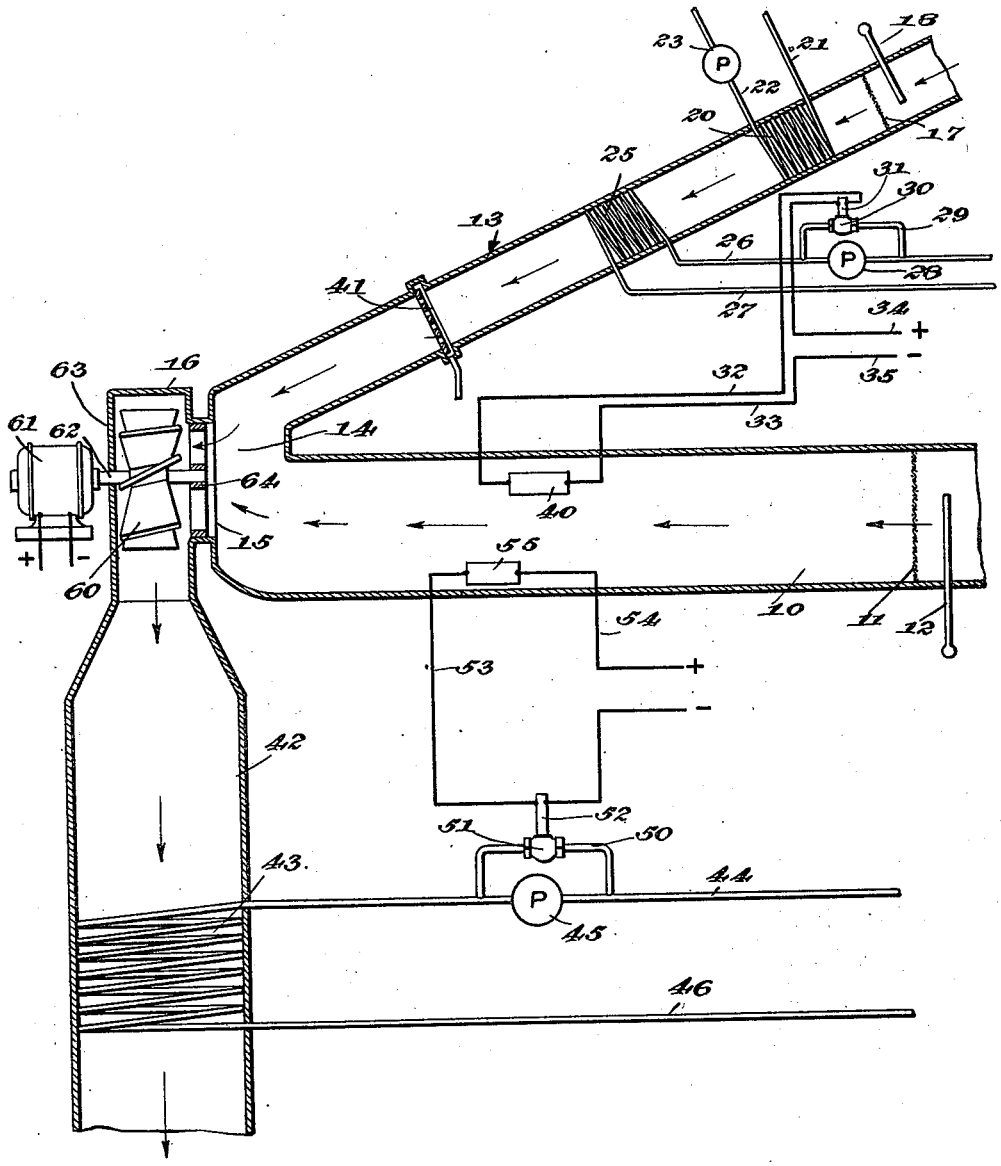
INVENTOR
J. E. Rasmusen Patented Oct. 29, 1935

2,018,804

UNITED STATES PATENT OFFICE 2,018,804

ARRANGEMENT FOR COOLING AIR

Jesse E. Rasmusen, Fort Worth, Tex.

Application September 4, 1934, Serial No. 742,665

4 Claims. (Cl. 257—2)

This invention relates to an arrangement for cooling air.

It has been proposed to employ in an air conditioning apparatus an air washer by which air from the recirculating air duct is by-passed around the air washer at times in an endeavor to control the humidity of the air which is sent to the space in a building. The fresh air in this arrangement is conducted directly into the air washer together with the air which is returned from the space so that both charges of air are supplied with moisture from the air washer while being mixed in the air washer, after which the air is cooled. By this arrangement control of humidity and temperature is impossible.

An object of the present invention is the provision of an arrangement for cooling air to be supplied to a space in a building in which the fresh air and the returned air from the space are directly admitted at a common point to a mixing chamber in which is located a fan for not only creating suction in the fresh air intake and the return air intake but for producing a homogeneous mixture of the air before it is discharged into a conduit or returned to the space, the fresh air being dehumidified in accordance with a desired degree of humidity and this degree is controlled by the humidity of the air being returned from the space.

A further object of the invention is the provision of an arrangement for cooling air which is supplied to a space in a building in which fresh air is cooled and then dehumidified before it is discharged into a mixing chamber together with air which is being returned from the space, the mixed air being cooled to the proper temperature with the cooling means being controlled in accordance with the temperature of the returned air, the fresh air being then dehumidified before it enters the mixing chamber, the degree of dehumidification being controlled by instrumentalities affected in accordance with the humidity of the air which is being returned from the space.

This invention will be best understood from a consideration of the following detailed description, in view of the accompanying drawing forming part of the specification; nevertheless, it is to be understood that the invention is not confined to the disclosure, being susceptible of such changes and modifications as define no material departure from the salient features of the invention as expressed in the appended claims.

In the drawing:—

The figure shows more or less diagrammatically and partly in section an arrangement for treating air which is supplied to a space.

Referring more particularly to the drawing, 10 designates a conduit for returning air from a space in a building and this air is adapted to be so treated that it will be supplied with fresh air, cooled, and provided with a proper degree of humidity before it is supplied to the space.

The air entering the conduit 10 must pass through a screen 11. The quantity of air passing through the conduit is controlled by a damper 12 which may be of any suitable construction for the purpose.

A fresh air intake 13 has a common junction at 14 with the conduit 10 where these conduits have a common communication as shown at 15 with a mixing chamber 16.

A screen 17 is provided at the outer end of the conduit 13 through which air must pass for the removal of foreign matter and dust. A damper 18 controls the quantity of air passing through the conduit 13.

A cooling coil 20 is located in the fresh air intake conduit 13 and has an inlet pipe 21 and an outlet pipe 22. A pump 23 is included in the outlet pipe 22 for forcing the cooling medium which may be water to the roof of a building where it is sprayed into the atmosphere. The supplied water is collected and returned through the pipe 21 through the cooling coils 20 at a lower temperature than when it passed through the pipe 22.

Dehumidifying coils 25 are located in the conduit 13 and between the inner end of the conduit and the outer end where the damper 18 is located.

The coils 25 are connected with an inlet pipe 26 and an outlet pipe 27. The inlet pipe 26 is provided with a pump 28 for forcing the cooling medium through the coils 25. A by-pass 29 is connected with the pipe 26 at opposite sides of the pump 28. An electrically controlled valve 30 is located in the by-pass and is normally closed.

A solenoid 31 or other suitable electrical device for operating the valve 30 is connected with said valve and is included in a circuit represented by the wires 32 and 33. These wires, as shown at 34 and 35, are connected with a source of current.

A humidostat 40 is located in the conduit 10 and is included in the electric circuit just described. The humidostat in the conduit is affected by the degree of humidity of the returned air in said conduit and therefore closes or opens the circuit accordingly for opening or shutting the valve 30 through the solenoid 31 whereby the pump will force the cooling fluid directly through the pipe 26 to the coil 25 or by-pass it through the branch 29.

An eliminator 41 is located in the conduit 13 and is adapted to remove the moisture which has been collected on the coil 25 and to discharge it from the conduit 13 to prevent the moisture from being carried to the mixing chamber 16 whence it will be carried through the discharge pipe 42 to the space (not shown).

Coils 43 are located in the discharge pipe 42 through which the air passes after it has been treated and before it reaches the space so that the proper temperature of the air will be had for the air which is conducted to the space.

A refrigerant is conducted through the pipe 44 and forced through the coils 43 by means of a pump 45. A return pipe 46 is also connected with the coils 43.

A pipe 50 has its ends in communication with the pipe 44 on opposite sides of the pump 45 and this by-pass is controlled by a valve 51 located in the pipe 50.

A solenoid 52 or some suitable electrical device operates the valve 51 and this solenoid is included in a circuit represented by the wires 53 and 54. These wires are connected with a source of current sufficient to properly operate the solenoid 52 when the circuit is closed by a thermostat 55.

A fan or other suitable mixing and suction-producing device 60 is located in the mixing chamber 16 and is adapted to not only draw the air in through the conduits 10 and 13 but to produce a homogeneous mixture of the air from said conduit and force said air through the discharge conduit 42.

A motor 61 is connected with the fan 60 for operating the fan. The fan is mounted on a shaft 62 which is directly connected with the motor 61. This shaft has bearings in a side wall 63 of the housing forming the mixing chamber and in a spider 64 at the common inlet 15 of the conduits 10 and 13.

The operation of my arrangement is as follows: Air is drawn in through the conduit 10 and through the fresh air conduit 13 by the fan 60. The dampers 12 and 18 are set to control the proper amount of air passing through the conduits and under normal conditions when once set they will be retained in position. The screens 11 and 17 clean the air in the respective conduits 10 and 13.

The air passing through the conduit 13 is conducted over the coils 20 and precooled before it reaches the dehumidifying coils 25. By this arrangement the fresh air is cooled before it reaches the dehumidifying coil and the temperature reduction of the fresh air in passing over the dehumidifying coils is regulated by the quantity of the cooling medium supplied by the pump 28. The regulation is controlled by the by-pass 29 and the valve 30 in accordance with the degree of humidity of the air passing through the conduit 10.

When the humidity is too low the humidostat 40 will close the circuit through the solenoid 31 and open the valve 30 so that part of the water from the discharge line of the pump is permitted to return to the suction line, thereby diminishing the amount of the refrigerated water or medium passing through the coils 25. When the humidity is high the valve will be closed to permit the refrigerated water or medium to be sent directly to the coils 25 by the pump 28. The result of less refrigeration in the dehumidifying coils is that the temperature of the air passing over the coils is not lowered as much as before and therefore less moisture is removed from the air. The relative humidity or hygrometric state however is lowered since the ratio of the quantity of aqueous vapor actually present in a given volume of the air to that which it would contain if it were saturated has been decreased due to the higher temperature of the air.

Where direct expansion of a refrigerant is employed as a cooling medium the electric circuit actuated by means of the humidostat will operate on an automatic expansion valve or similar means to reduce the amount of refrigerant entering the dehumidifying coils with the same result.

The fresh air after being dehumidified enters directly with the air from the return pipe 10 to the mixing chamber 16 where it is thoroughly mixed and discharged into the conduit 42 over the cooling coils 43.

The amount of refrigerating or cooling medium sent through the coils 43 is controlled by the valve 51 in the by-pass 50 around the pump 45 and this valve is controlled by means of a solenoid 52 which is in the circuit and includes the wires 53 and 54 and the thermostat 55. The thermostat being located in the conduit 10 is set to maintain a predetermined temperature of the pre-mixed air passing through the discharge conduit 42 so that when the temperature of the air in the conduit 10 is high the valve 50 will be closed, permitting a greater supply of refrigerating medium passing through the coils 43. When the temperature of the air in the conduit 10 is lower the circuit will be closed to the solenoid 52 whereby the valve 51 will be opened, permitting part of the cooling medium in the discharge line to be returned to the suction line of the pump.

I claim:

1. An air cooling arrangement comprising a mixing chamber, a fresh air conduit leading into the mixing chamber, a return conduit from a space which is to be supplied with pretreated air, said return conduit having with the fresh air conduit a common inlet junction with the mixing chamber, dehumidifying coils in the fresh air conduit adapted to be supplied with a cooling fluid, a humidostat in the return conduit, a pump for maintaining circulation of the cooling fluid, a by-pass around the pump and provided with a normally closed valve, an electrically actuated means for opening the valve, a circuit including the electrically operated means and the humidostat adapted to be closed by the humidostat, means in the chamber for thoroughly mixing the air from the fresh air conduit and the return conduit, and means for cooling the mixture of air.

2. An air cooling arrangement comprising a fresh air conduit, a return air conduit from a space which is to be supplied with pretreated air, a discharge conduit connected with the fresh air conduit and return air conduit and leading to the space, dehumidifying means in the fresh air conduit adapted to be supplied with a cooling fluid, a humidostat in the return conduit, means for maintaining circulation of the cooling fluid, by-pass means for causing the cooling fluid at times to be conducted around the means for maintaining circulation of the fluid, means for controlling the by-pass means, means adapted to be set in action by the humidostat for causing operation of the controlling means, and means for cooling the air passing through the discharge conduit.

3. An air cooling arrangement comprising a mixing chamber, a fresh air conduit leading into the mixing chamber, a return conduit from a space which is to be supplied with pretreated air, said return conduit having with the fresh air conduit a common inlet junction with the mixing chamber, a discharge conduit leading from the mixing chamber to the space, cooling coils in the discharge conduit adapted to be supplied with a cooling fluid, means for maintaining circulation of the cooling fluid, a by-pass means for diverting the cooling fluid from the circulating means, means for controlling the by-pass means, and a temperature responsive means in the return conduit for causing the controlling means to be set in operation.

4. An air cooling arrangement comprising a mixing chamber, a fresh air conduit and a return air conduit from a space which is to be supplied with pretreated air, said conduits leading to the mixing chamber, a discharge conduit leading from the mixing chamber to the space, coils in one of the conduits, means for maintaining circulation of a cooling fluid in the coils, a by-pass means for diverting the cooling fluid from the circulating means, means for controlling the by-pass means, and a temperature responsive means in another of the conduits for causing the controlling means to be set in operation.

JESSE E. RASMUSEN.